Dec. 1, 1942.          J. M. BONBRIGHT                    2,303,980
                       AUTOMOBILE ASH TRAY
                      Filed Dec. 13, 1939              2 Sheets-Sheet 1
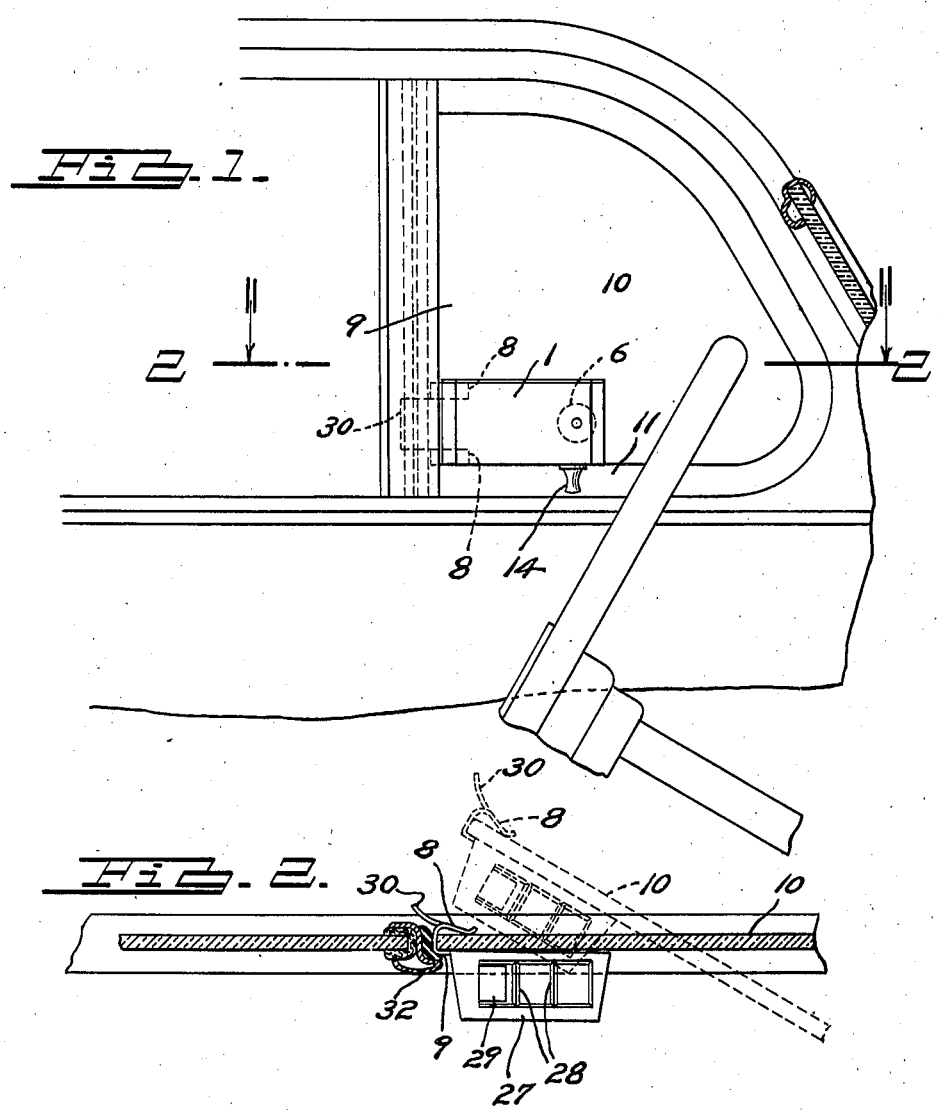
INVENTOR.
John M. Bonbright
BY
                    ATTORNEY.

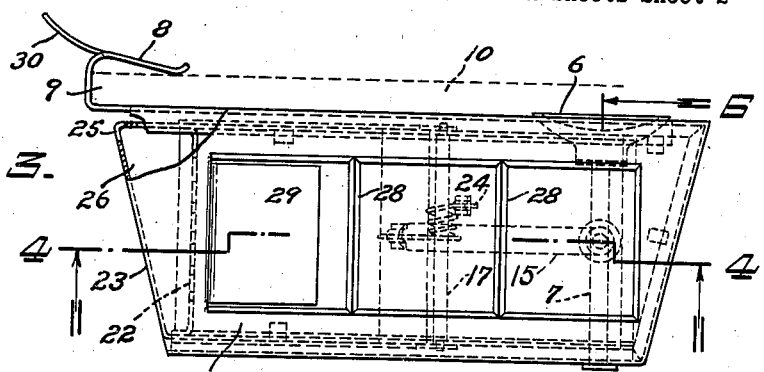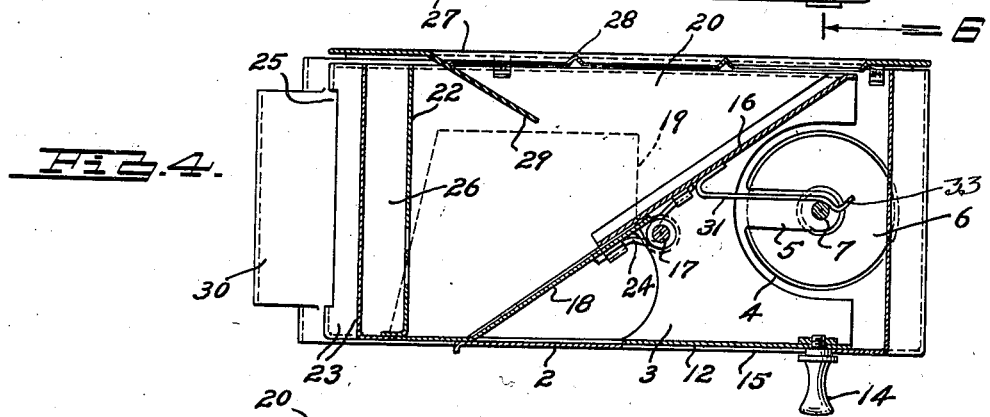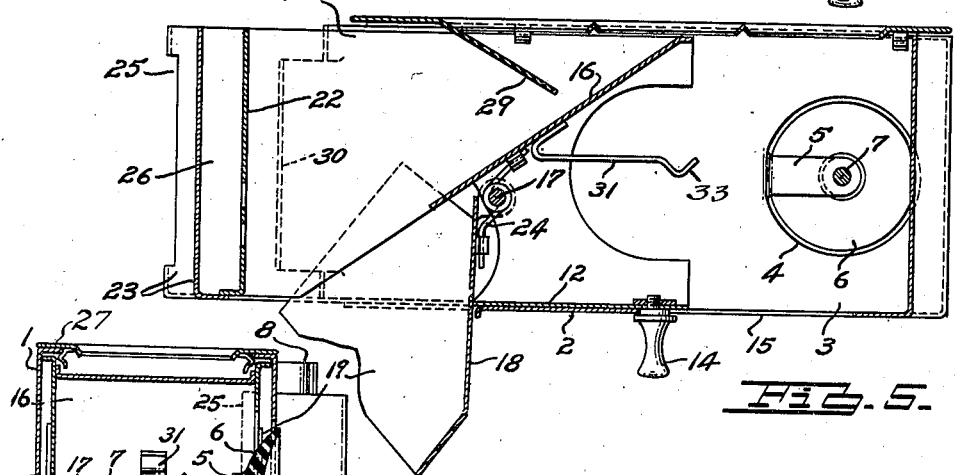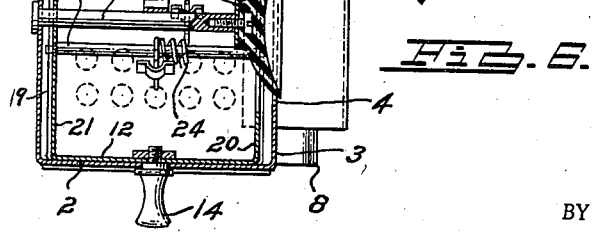

Patented Dec. 1, 1942

2,303,980

UNITED STATES PATENT OFFICE 2,303,980

AUTOMOBILE ASH TRAY

John M. Bonbright, Grosse Pointe Park, Mich.

Application December 13, 1939, Serial No. 309,074

8 Claims. (Cl. 206—19.5)

This invention relates to ash trays for use in automobiles, and the object of the invention is to provide an ash tray arranged to be attached either to the pivoted ventilating pane in the front door of an automobile or to the pivoted pane in the rear quarter window of an automobile.

One of the particular objects of the invention is to provide an ash tray through which a current of air is caused to pass when the automobile is in motion, and to be discharged outside the automobile, so that smoke, fumes, and odors from cigarette or cigar stubs or loose tobacco deposited in the ash tray will be carried away by the air current and prevented from permeating the interior of the automobile.

Another object of the invention is to provide an ash tray of the character described which by manual movement can be caused to eject its contents outside the automobile without the necessity of removing the ash tray or any part thereof from its normal position as mounted within the car.

These objects and the several novel features of the invention are hereinafter more fully described and claimed and the preferred form of construction by which these objects are attained is shown in the accompanying drawings in which—

Fig. 1 is a view from the interior of the automobile showing the ash tray mounted on the front ventilating pane.

Fig. 2 is a section taken on line 2—2 of Fig. 1.

Fig. 3 is an enlarged plan view of the ash tray.

Fig. 4 is a section taken on line 4—4 of Fig. 3.

Fig. 5 is a section similar to Fig. 4 showing how the interior sliding portion is caused to dump the contents of the ash tray.

Fig. 6 is a section taken on line 6—6 of Fig. 3.

The device comprises a rectangular casing having sides 1 and 3 and a bottom portion 2 as shown more particularly in Fig. 6. An aperture 4 is formed in the side 3 and is so shaped as to leave a tongue 5 extending into the center of the aperture 4. The threaded stem of a rubber suction cup 6 shown in Figs. 5 and 6 extends through a hole in the tongue 5 and a hollow screw 7 extends through the wall 1 and is screwed onto the threaded stem of the rubber suction cup 6 as shown in Fig. 6. At the extreme rear edge the side 3 is provided with a return bent flange or spring clip 8 as shown in Fig. 3 which is arranged to engage over the rear edge 9 of the pivoted ventilator pane 10 as shown in Fig. 2. By engaging this return bent flange 8 over the edge 9 and pressing the rubber suction cup 6 into full contact with the surface of the ventilator pane 10 and tightening the hollow screw 7 the ash tray is retained in position on this ventilator pane preferably resting on the top edge of the metal channel frame 11 of the ventilator pane as shown in Fig. 1.

Inside the casing formed by the walls 1, 2 and 3 is an ash receptacle which is slidably mounted within the outer casing. This ash receptacle comprises a bottom portion 12 shown in Figs. 5 and 6 to which is secured a knob 14 extending through a slot 15 in the bottom 2 of the outer casing. This inner sliding receptacle is provided with a sloping floor 16 at the top and carries a cross rod 17 near the center. A dumping hopper 18 is pivotally mounted on the cross rod 17 and in the normal position shown in Fig. 4 this hopper provides a continuation for the sloping floor 16 and at its lower end rests on the bottom 2 of the outer casing as shown in Fig. 4.

This dumping hopper is provided with sides 19 fitting outside the sides 20 and 21 of the slidable ash receptacle. The casing is provided with a perforated baffle plate 22 shown in Figs. 4 and 5 and with a closed end wall 23 spaced from and parallel with the plate 22 and forming the rear end of the assembly. The sliding ash receptacle is movable from the position shown in Fig. 4 to that shown in Fig. 5 by the knob 14 and is returnable also to the original position by means of this knob. As this slidable ash receiver is moved outwardly to the left of the position shown in Fig. 3, the spring 24 on the hinged hopper 18 turns this hopper downward to dump the ashes and cigarette and cigar stubs or other material deposited in the ash receptacle, shown in Fig. 4, when it is in the closed position and as the slidable member is being returned to the position shown in Fig. 4 the hopper 18 is moved back up to the closed position against the pressure of the spring 24 by being forced upward by its contact with the bottom 2 of the outer casing.

As will be noted in Figs. 3, 4 and 5 the end wall 23 of the casing is cut away at the corner to form a slot 25 adjacent the return bent flange 8 through which slot air may be withdrawn from the compartment 26 between the perforate wall 22 and the end wall 23 of the casing, whenever the car is in motion and the ventilation pane 10 is open even only slightly. A cover 27 is provided which fits over the edges of the walls 1 and 3 of the outer casing and remains stationary with the outer casing while the movable ash receptacle is slidable therebeneath. This cover is provided with apertures as shown in Fig. 3 separated by the cross bars 28. At the rear the cover is provided with a depressed angular flange 29 shown in Figs. 3, 4 and 5 to act as a vane guiding air drawn into the ash receiver to flow from front to rear over the contents of the receiver and through the baffle plate 22 to atmosphere and thus sweep smoke fumes, light ash, and odors out through the perforated partition 22 and the slot 25.

In use, the device is attached to the glass ventilating pane as hereinbefore described with the parts in the closed position shown in Fig. 4, Ashes and cigarette or cigar stubs dropped into the receptacle through the openings in the cover 27 will slide into the hopper 18. A particular advantage of this invention is that lighted cigarettes and cigars need not be extinguished or "snubbed" but may be dropped into the receptacle while they are burning. The ventilating pane of the automobile need be open but slightly, or only far enough to provide a narrow passage from the slot 25 to the outside air. Therefore the suction caused by the motion of the automobile, which is the basis of the ventilating systems in automobiles equipped with pivoted ventilation panes, causes air to enter the ash receptacle through the cover plate and sweep over the contents of the receptacle and to pass through the perforated baffle plate 22 and the slot 25 to the outer air. Although the suction created by the air-stream flowing past the rear edge of the ventilating pane when the car is in motion is normally sufficient to induce air to pass through the ash tray, the invention may have a vane or flange 30 projecting outward from the plane of the ventipane and toward the rear of the automobile to augment the suction effect over the full length of the slot 25 in the ash tray, this vane being of especial value when the car is moving at low speed. The flow of air through the receptacle carries smoke, fumes, and odors to the outside air and has the incidental advantage of promoting combustion of lighted cigarette or cigar stubs dropped into the receptacle and thus tending to cause the stubs to continue to burn rapidly and thus be reduced to ash.

In the closed position the ash tray is secured against accidental opening and dumping of ashes or sparks or stubs of cigarettes or cigars inside the car because the slidable receptacle is prevented from moving far enough to permit the hopper 18 to open by the fixed vertical bar 32 which is a permanent fixture in the car and by the spring arm 31 hereinafter described which has the further advantage of holding the slidable receptacle in firm contact with its enclosing outer casing and thus preventing rattling. Similarly the spring 24 holds the hopper and the rear portion of the slidable receptacle in firm contact with their adjacent enclosing walls.

By opening the ventilating pane a sufficient distance to permit the slidable receptacle to clear the fixed vertical bar of the automobile, as shown in the dotted lines in Fig. 2, and manually pushing the knob 14 toward the rear, the sliding receptacle may be moved outward to the limit permitted by the slot 15. As the slidable receptacle moves outward the hopper 18 drops under the pressure of the spring 24 and discharges its contents outside the automobile. The distance the ventilating pane is opened away from the exterior surface of the car, and the sloping floor of the hopper, which will throw the contents outward, will tend to make the contents clear the running board of the automobile, and moreover a quick snapping opening of the sliding receptacle will have the effect of projecting the contents of the receptacle outward from the car. Then the receptacle may be emptied either while the car is at a standstill or when it is in motion.

When in the position shown in Fig. 4, the ventilator pane may be fully closed as shown in Fig. 2 inasmuch as the compressibility of the rubber weather stripping on the vertical bar easily accommodates the thin metal of the spring clips so that the only portion of the ash receiver on the exterior of the ventilating pane is the return bent flange or spring clip 8 and the vane or flange 30.

In order to secure the slidable member in the closed position, and to make it rattleproof, a spring arm 31 is attached to the sloping wall 16 of the slidable receptacle as shown in Figs. 4 and 5 and is provided with an off-set latch 33 which engages the rod 7 of the rubber suction cup 6 and holds the slidable receptacle in closed position in the outer casing. This latch will snap off or over the rod 7 as the slidable receptacle is moved by the knob 14 respectively to open or close the ash tray.

From the foregoing description it becomes evident that the device is simple and efficient in operation, is in accessible position for the user at all times, renders needless the throwing of burning cigarette or cigar stubs out of the automobile, may be readily emptied of such stubs and other refuse and provides a device which accomplishes the objects described.

Having thus fully described my invention, its utility and its mode of operation, what I claim and desire to secure by Letters Patent of the United States is:

1. An ash tray for use in an automobile having a window opening and a ventilating pane pivoted at its forward edge, comprising a casing mounted on the inner face of the ventilating pane with its rear end adjacent the rear edge of the pane, said casing having an ash receiving opening in its upper surface, an opening to the atmosphere at its rear end adjacent the rear edge of the pane, and an opening in its bottom, an ash receptacle movable longitudinally of the casing into which ashes and refuse may be introduced through the said ash receiving opening of the casing, said receptacle including a hopper pivoted at one end and having a discharge opening therein at a distance from its pivot point, means for moving the ash receptacle longitudinally of the casing, means automatically functioning as a result of movement of the receptacle in one direction to turn the hopper on its pivot through said bottom opening of the casing to dump the contents of the hopper through its discharge opening, and means for causing the hopper to return to ash receiving position by movement of the receptacle in the opposite direction in the casing.

2. An ash tray for use in an automobile having a window opening and a ventilating pane pivoted at its forward edge, comprising a casing mounted on the inner face of the ventilating pane with its rear end adjacent the rear edge of the pane, said casing having an ash receiving opening in its upper surface, an opening to the atmosphere at its rear end adjacent the rear edge of the pane, and an opening in its bottom, an ash receptacle movable longitudinally of the casing into which ashes and refuse may be introduced through the said ash receiving opening of the casing, said receptacle including a hopper pivoted at one end and having an opening at a distance from its pivotal axis, means for moving the ash receptacle longitudinally of the casing, a spring automatically functioning as a result of movement of the receptacle in one direction to turn the hopper on its axis through said bottom opening of the casing to dump the contents, and means for causing the hopper to return to ash receiving position by movement of the receptacle in the opposite direction in the casing.

3. An ash tray for use in an automobile having a window opening and a pivoted ventilating pane, a casing, a spring clip attached to one end of the casing and engaging over the rear edge of the pane and means at the opposite end for securing the same to the inner surface of the pane, said casing having an ash receiving opening in the upper surface and an opening to the atmosphere so positioned that forward movement of the vehicle causes air to pass into the said ash receiving opening and thence to the atmosphere, said casing having an opening in its bottom, an ash receptacle movable longitudinally of the casing into which ashes, cigar and cigarette stubs may be introduced through the said ash receiving opening of the casing into the ash receptacle, a closure for said bottom opening of the casing, means for moving the ash receptacle longitudinally of the casing, means automatically functioning as a result of movement of the ash receptacle in one direction to open the closure member to thereby permit the contents of the receptacle to discharge through the bottom opening of the casing and means whereby movement of the ash receptacle in another direction to ash receiving position closes said closure element.

4. An ash tray for use in an automobile having a window opening and a pivoted ventilating pane permitting the rear edge of the pane to be opened or closed, a casing, a spring clip attached to one end of the casing and engaging over the rear edge of the pane, a suction cup toward the opposite end of the casing for engaging the surface of the pane, the said clip and the said suction cup supporting the ash tray on the inner face of the pane with its rear edge adjacent the rear edge of the pane, said casing having an ash receiving opening at a distance from its rear edge and an opening to the atmosphere at the rear edge for the purpose described, an ash receptacle mounted within the casing and having a hinged bottom, a spring means tending to turn the said hinged bottom to open the same for the discharge of ashes from the receptacle, said casing having an opening in its bottom through which the said hinged bottom of the receptacle may turn, means for moving the ash receptacle longitudinally of the casing, movement of the receptacle in one direction permitting the said hinged bottom to open by the said spring means and movement in the opposite direction causing the said hinged bottom to close by contact thereof with the edge of the opening in the casing bottom.

5. An ash tray for mounting on the inner face of a pivoted ventilating pane of an automobile window opening, comprising a casing, means for attaching the same to the inner face of the pane with the rear end of the casing adjacent the pane edge, the said casing having an opening to receive ashes and refuse, a hopper within the casing having an open upper end to receive ashes deposited through the said opening, the said casing including a foraminous wall and an imperforate rear wall adjacent the foraminous wall and forming the rear end of the hopper, and a hinged bottom, the said casing having an opening to the atmosphere adjacent its rear edge through which air is drawn through the casing and the said foraminous wall to the atmosphere by the forward movement of the vehicle, means for moving the hopper longitudinally of the casing, the said casing having an opening in its bottom, spring means tending to open the said hinged bottom of the hopper through the casing opening on movement of the hopper in one direction, movement of the hopper in the opposite direction causing the hinged bottom to close by contact with the forward edge of the bottom opening in the casing, and a spring clip tending to releasably hold the hopper on movement of the same to close the said hinged bottom.

6. An ash tray for an automobile having a window opening and a pivoted ventilating pane, comprising a casing mounted on the inside of the ventilating pane adjacent the rear edge thereof, said casing having an ash receiving opening in its upper surface, an opening to the atmosphere adjacent the rear edge of the pane, and an opening in its bottom, means associated with the receptacle and the rear edge of the pane tending to produce an area of lessened pressure at the rear edge of the pane by movement of the vehicle tending to induce air flow through the casing, an ash receptacle slidable longitudinally of the casing, said receptacle including a pivoted hopper having an open discharge end opposite the pivot point, means for moving the ash receiver longitudinally of the casing, means automatically operating to turn the hopper on its pivot to dump the contents thereof through said bottom opening of the casing upon movement of the ash receiver in the casing in one direction, and means causing the hopper to return to ash receiving position by movement of the ash receptacle in the opposite direction.

7. An ash tray for an automobile having a window opening and a ventilating pane movable to open or close the same relative to the rear edge of the window opening, said tray comprising a casing mounted on the inside of the pane and having an ash receiving opening in its upper surface and an opening to the atmosphere adjacent the rear edge of the pane, an outturned plate-like element at the rear edge of the pane whereby, when the pane is opened, forward movement of the automobile causes air to flow through the said openings to the atmosphere, an ash receptacle having an open upper end and being movable longitudinally of the casing, a hopper pivoted in the casing and having an open end opposite the pivot means causing the hopper to turn on its pivot through the said casing opening by movement of the ash receiver in one direction in the casing to thereby dump the contents thereof through the open end of the hopper, and means whereby movement of the hopper in the opposite direction causes the ash receiver to return to ash receiving position.

8. An ash tray for use in an automobile having a window opening and a ventilating pane mounted to turn with its rear vertical edge outwardly from the rear vertical edge of the opening closable thereby, comprising a casing having a clip at one end for engaging over the rear edge of the pane, a plate-like element extending outwardly from the clip into an air stream caused by forward movement of the vehicle to provide an area of lessened air pressure at the opening between the rear edge of the pane and rear vertical edge of the opening, means in addition to the said clip for supporting the casing on the inner surface of the pane, said casing having an opening at its rear end adjacent the rear edge of the pane and in horizontal alignment with the said plate-like element and an ash receiving opening in its upper surface into which ashes and refuse may be deposited, the arrangement providing a means whereby movement of the vehicle causes an air stream to pass through the ash receiving opening of the casing and thence outwardly through the said rear opening of the casing to the atmosphere.

JOHN M. BONBRIGHT.